July 30, 1968   J. L. MITCHELL   3,394,856
TAG GUN AND MOUNTING DEVICE
Filed Oct. 21, 1965
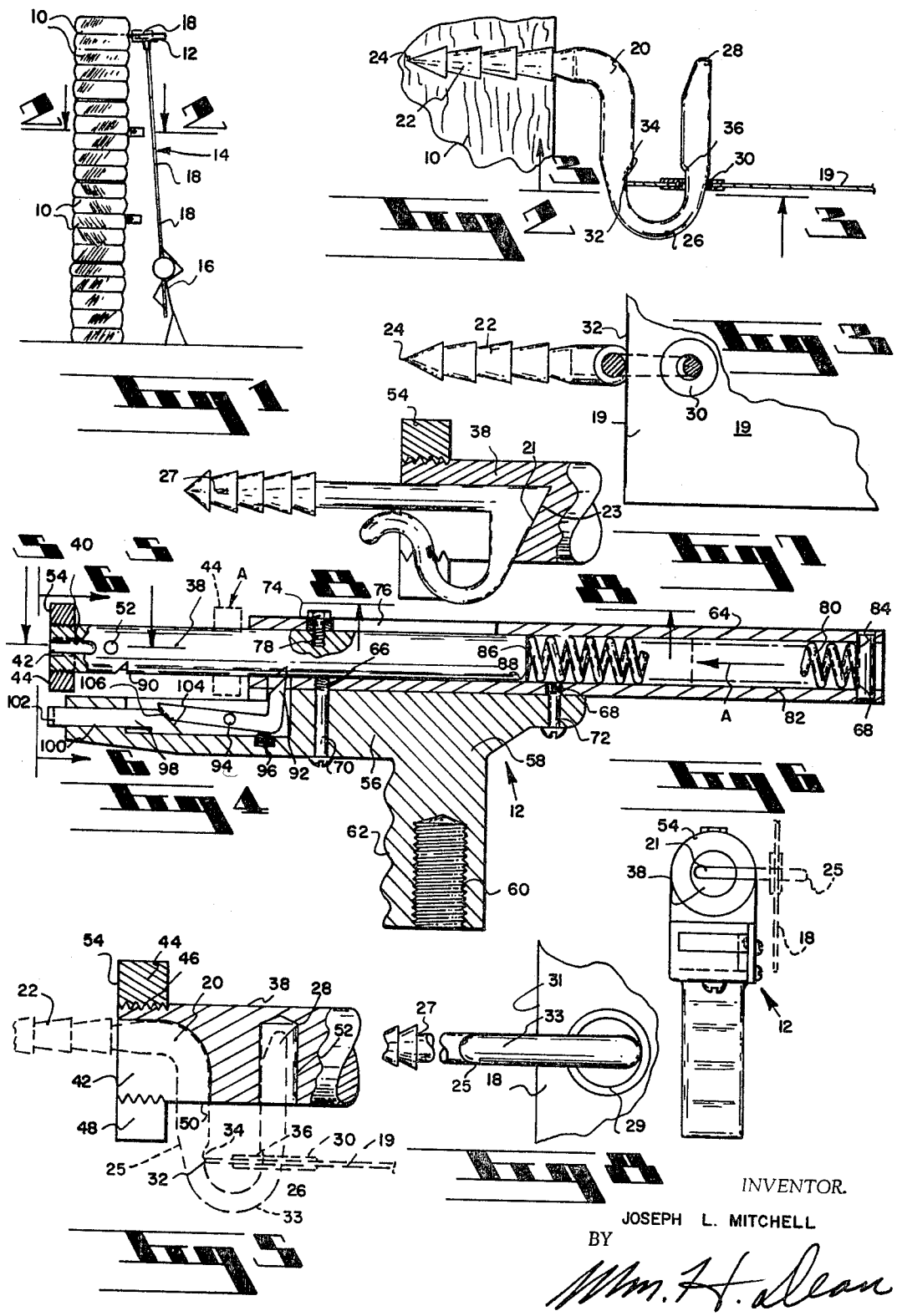
INVENTOR.
JOSEPH L. MITCHELL
BY
Wm. H. Dean

United States Patent Office 3,394,856
Patented July 30, 1968

3,394,856
TAG GUN AND MOUNTING DEVICE
Joseph L. Mitchell, 234 N. Fraser Drive,
Mesa, Ariz. 85201
Filed Oct. 21, 1965, Ser. No. 499,483
7 Claims. (Cl. 227—146)

ABSTRACT OF THE DISCLOSURE

A tag gun and mounting device comprising a hand operated gun for projecting a tag holding projectile into a bale of cotton or the like, such that the projectile becomes impaled in the side of the bale of cotton, and holds the identification tag extending outwardly from the bale, the projectile having a loop-shaped portion adapted to hold a tag laterally of a spring loaded projecting plunger of the gun so as to permit the tag and the projectile to be propelled toward the bale of cotton or the like, while the tag moves free and clear of the side of the gun when propelled in connection with the projectile.

---

This invention relates to a tag gun and mounting device, and more particularly, to a tag gun and mounting device comprising a tag gun having a projectile adapted to be projected into the side of a bale of cotton or the like for holding a tag to identify the bale of cotton or other similar articles.

It has been a problem properly to identify bales of cotton or other articles and to apply identifying indicia, such as tags or other subject matter to these bales or articles, in order that during the transportation thereof, buying or selling thereof, the transportation information as well as the ownership may be indicated on tags directly secured to the bales of cotton or other articles.

It has been a problem quickly to apply tags to bales of cotton or other similar articles and also to provide for the holding of such tags on such bales and in position to be viewed by handling truck drivers passing through aisles between stacks of bales and, further, to provide for the changeability of the tags from time to time.

An object of the invention is to provide a tag gun and tag mounting device which will readily and quickly and very forcefully impale a holding member securely in a bale of cotton for the purpose of holding an identification tag in extended readable position relative to the outer surface of a bale of cotton or other similar objects.

Another object of the invention is to provide a novel tag gun and projectile, whereby a tag secured to the projectile is held thereon during the projection of the projectile at an impaling portion thereof into the side of a bale of cotton, all of which permits very secure attachment of identification tags to such bales of cotton or other similar articles.

Another object of the invention is to provide a novel tag gun projectile and tag means wherein a socket in the forward end of a power operated plunger holds a projectile which has a laterally extending portion disposed to carry a tag at one side of the plunger so that the projectile may be forcefully projected into the side of a bale of cotton subsequent to the connection of the tag with the projectile and thereby provide for quickly and securely connecting identification tags to bales of cotton or other similar articles.

Further objects and advantages of the present invention may be apparent from the following specification, appended claims and accompanying drawings, in which:

FIG. 1 is a side elevational view of a stack of cotton bales showing a tag gun of the invention on small scale and showing a man diagrammatically utilizing the tag gun of the invention to apply tags to the bales of cotton in the stack;

FIG. 2 is a side elevational view of a tag holding hook member of the invention having an impaling portion disposed in a fragmentary portion of a bale of cotton and showing fragmentarily and in section a tag of the present invention carried by said hook;

FIG. 3 is a fragmentary sectional view taken from the line 3—3 of FIG. 2;

FIG. 4 is a longitudinal sectional view of a tag applying gun of the present invention, showing portions fragmentarily and broken away to amplify the illustration;

FIG. 5 is a phantom view of the tag hook shown in FIG. 2, disposed in a fragmentary portion of a plunger of the tag gun, shown in FIG. 4;

FIG. 6 is a front elevational view taken from the line 6—6 of FIG. 4;

FIG. 7 is a view similar to FIG. 5, showing a modified tag hook of the invention and a modified portion of the tag gun for holding and projecting said hook; and FIG. 8 is a fragmentary elevational view taken from the line 8—8 of FIG. 7.

As shown in FIG. 1 of the drawings, a plurality of bales of cotton or other similar articles designated 10, are disposed in superimposed stacked relation to each other and a tag gun 12 of the present invention is carried by a long handle 14 to be operated by a man illustrated diagrammatically at 16. The tag gun 12 is operable on contact with the bales 10 and is disposed to apply tags 18 of the invention in connection with tag hooks which are projected into the bales 10 by the tag gun 12.

It will be understood that the stacks of bales 10 are disposed in rows and that these rows having aisle ways between so that handling trucks may pass between the stacks of bales 10 and may inspect the tags 18 relative to changes of ownership or to shipping instructions or other information which may be carried by the tags 18.

As shown in FIG. 7 of the drawings, the tag gun 12, as will be hereinafter described in detail, is provided with a tag driving plunger 38 having a socket 21 in its forward portion. This socket being adapted to engage and abut a rearward portion 23 of a tag holding hook 25 provided with a cotton bale impaling portion 27 at its forward end. The hook 25 is adapted to hold an eyelet 29 of a tag 18, as shown in FIG. 1 of the drawings, such that the tag 18 may have its flat sides disposed in a vertical plane.

A forward edge 31 of the tag 18 is held by a U-shaped portion 33 of the loop-shaped hook 25 in order to hold the tag 18 in a position at right angles to the bales 10 and with the opposite side surfaces of the tag 18 in a vertical position, as shown in FIG. 8 of the drawings.

According to a modification shown in FIGS. 2 to 5 of the drawings, a tag 19 is secured to a respective bale by means of a tag hook 20, such as shown in FIG. 2 of the drawings. This tag hook is provided with an impaling portion 22 having conically-shaped buttress portions which are adapted to be projected into the bale by the tag gun 12 of the invention. The buttress impaling portion 12 is such that it tends to resist removal thereof in a direction opposite to the pointed portion 24 of the impaling portion 22.

Integral with the impaling portion 22 is a substantially U-shaped hook portion 26 having an open end 28 over which an eyelet 30 of the tag may be placed, such that one end 32 of the tag 19 may abut the hook portion 26 adjacent the ledge or detent 34 while the eyelet 30 may engage an opposite portion of the hook 26 adjacent a ledge or detent 36, such that opposite sides of the tag 19 is held by the hook 26 in substantially a horizontal plane.

As shown in FIGS. 4 and 5 of the drawings, the tag gun 12 of the invention is provided with a driving plunger 38 having a slot portion 40 in its forward end 42. The forward end 42 being surrounded by an enlarged bushing 44 which operates as an abutment for the side of a bale when the tag gun projects the impaling element 22 of the hook into the side of a bale, as will be hereinafter described. This ring 44 is secured peripherally on the plunger 38 by a common screw thread structure 46 and one side of the ring 44 is provided with a slot 48 coinciding with the slot 42 of the plunger 38, this slot being opened at one side 50 of the plunger 38 so that the hook 26 may project from said side 50 and outwardly relative to the slot 42 and the end 28 of the hook may be held in a laterally disposed recess 52 which is open at the side 50, whereby the end 54 of the ring 44 may be projected into engagement with the side of a cotton bale, then the plunger 38 may be moved laterally in a direction away from the open side 50 to relieve the hook 26 and its end 28 from the slot 42 and the recess 52, respectively, and to thus leave the hook 26 securely in connection with the bale, as shown in FIG. 2 of the drawings, in order to hold the tag 19 securely in connection with said bale.

The tag gun 12, as shown in FIG. 4 of the drawings, is provided with a frame 56 having a handle 58 provided with an internally screw threaded socket 60 disposed to receive a complementally screw threaded portion of the elongated handle member 14. This member 14 may be a section of lightweight tubing capable of extending the tag gun 12 to upper levels and operable by a man 16 in order to reach the uppermost bales 10 in the stack, as shown in FIG. 1 of the drawings.

The frame 56 surrounding the internally screw threaded socket 60 is provided with a handgrip portion 62 which may be held in a person's hand for operating at the lower levels of stacks of bales or may be used in a person's hand when riding on a conventional bale handling truck or the like.

Secured to the frame 56 is a plunger barrel 64 which is a hollow tubular barrel having internally screw threaded openings 66 and 68 screw threadably engaged by screws 70 and 72, respectively, extending through the frame 56, whereby the barrel 64 is fixed on the frame 56.

The plunger 38 is reciprocally mounted in the barrel 64 and is retained by a bolt 74 extending through an elongated slot 76 in the upper portion of the barrel 64, the inner end of the screw 74 being externally screw threaded at 78 and engaged in an internally screw threaded hole in the plunger 38, thereby retaining the plunger 38 against compression loading of a compression spring 80 contained in a bore 82 of the hollow tubular barrel 64, one end 84 of the spring 80 is retained by a cross pin 86 in a rearward end of the barrel 64, while a forward portion 86 of the spring 80 is abutted to a rearward end 88 of the plunger 38 tending to force the plunger 38 in a direction of an arrow A in FIG. 4 of the drawings.

The plunger 38 is provided with a sear notch 90 adapted to be engaged and held by a sear 92 pivoted on a pin 94 in connection with the frame 56. A spring 96 urging the sear 92 toward the plunger 38 and into the sear notch 90 when the plunger is retracted to the broken line position, as shown in FIG. 4 of the drawings.

A trigger 98 is reciprocally mounted in a bore 100 in the frame 56, this bore being axially parallel with the plunger 38. The trigger 98 having a forward bale engaging portion 102 and a rearward sear actuating cam 104 engaging a complemental cam portion 106 of the sear 92, such that rearward movement of the trigger 102 in a direction opposite the arrow A will force the cam 104 to act upon the cam 106 and pivot the sear 92 against compression of the spring 96 about the axis of the pin 94 and to release the sear 92 from the notch 90 permitting the spring 80 to propel the plunger 38 forward in a direction of the arrow A and to force the impaling portion 22 of the hook 20 into the bale 10, as shown in FIG. 2 of the drawings. Thus, the gun 12 may be operated remotely on the rod 14 simply by swinging the gun toward the bale with the hook 20 in the position, as shown in FIG. 5, and with the tag 18 attached. When the gun engages the bale at the frontal portion of the trigger 102, it releases the plunger and causes the spring to project the plunger 38 together with the hook 20 and its impaling portion 22 into the bale until the ring 54 abuts the side of the bale which gauges the depth of penetration of the impaling portion 22 into the bale.

In operation, the plunger 38 is forced manually backward into a position wherein the ring 44 assumes a broken line position A, as shown in FIG. 4 of the drawings, whereupon the sear notch 90 is engaged by the sear notch 92 for holding the plunger 38 under compressive load of the spring A such that the trigger 102 when pressed against the side of a bale will release the plunger to project it forward to the solid line position, shown in FIG. 4.

When the plunger is disposed in cocked position with the ring 44 in the broken line position A, the projectile 22 including the loop-shaped portion 33 and the tag 19, is disposed in the recess 42, as shown in FIG. 5, and with one end of the hook portion in the recess 52, as shown in FIG. 5. When the trigger 102 is engaged with a bale, the plunger is released, the spring 80 moves the plunger forward and impales the portion 22 of the projectile into the side of the bale, whereupon the plunger 38 is moved in an upward position, as shown in FIG. 5, to remove the recess 52 of the plunger 38 from the hook portion 28, and to remove the shank of the projectile from the recess 42. Thus, the plunger 38 is moved away from the tag 19 which is held by the projectile 25. It will be appreciated that when the recess 42 is directed toward the side of the gun, that the gun may be moved laterally to remove the recess 52 from the hook 28, as desired. It will be seen from the section line 5—5 of FIG. 4 that the plunger 38 may be moved laterally to relieve the recess 52 from the end 28 of the projectile 25. This may be done either manually by holding the handle 62 or by manually moving the elongated handle 14 in such a direction after the impaling portion 22 of the projectile 25 has been securely embedded in the bale of cotton.

It will be understood that this device may be used for tagging articles other than bales of cotton.

It will be understood that the tag gun 12 may be modified as hereinbefore described, for use in placing tags 18 or 19 in vertical or horizontal planes, as shown in the drawings.

It will be obvious to those skilled in the art that various modifications of the present invention may be resorted to in a manner limited only by a just interpretation of the following claims.

I claim:

1. In a tag mounting device: a projectile having an impaling portion adapted to be projected into the side of a bale of cotton or the like; a loop portion on said projectile; an identification tag having an eye structure adapted to be placed over said loop portion; and means on said loop portion and means on said tag cooperating for holding said tag in outward extended position relative to said impaling portion and edge portion of said tag extending beyond said eye, and engaging an opposite side of said loop portion for holding said tag in fixed position relative to said projectile.

2. The invention, as defined in claim 1 wherein: said opposite side of said loop is provided with a ledge engaged by said edge of said tag.

3. In a tag mounting device: a projectile having an impaling portion adapted to be projected into the side of a bale of cotton or the like; a loop portion of said projectile; an identification tag having an eye structure adapted to be placed over said loop portion; and means of said loop portion and said tag for holding said tag in outward extending position relative to said impaling portion; said loop portion being open at one side to permit removal of said eye portion of said tag and replacement thereof with another tag or a changed tag.

4. In a tag mounting device: a projectile having an impaling portion adapted to be projected into the side of a bale of cotton or the like; a loop portion of said projectile; an identification tag having an eye structure adapted to be placed over said loop portion; and means of said loop portion and said tag for holding said tag in outward extending positive relative to said impaling portion; said loop portion being open at one side to permit removal of said eye portion of said tag and replacement thereof with another tag or a changed tag; said loop-shaped portion being substantially U-shaped and open laterally of the axis of said impaling portion.

5. In a tag mounting device; a projectile having an impaling portion adapted to be projected into the side of a bale of cotton or the like; a loop portion of said projectile; an identification tag having an eye structure adapted to be placed over said loop portion; and means of said loop portion and said tag for holding said tag in outward extending position relative to said impaling portion; said loop portion being open at one side to permit removal of said eye portion of said tag and replacement thereof with another tag or a changed tag; said loop-shaped portion being substantially U-shaped and open laterally of the axis of said impaling portion; said impaling portion having barbed portions adapted to resist withdrawal of said impaling portion from a bale of cotton or the like.

6. In a tag gun the combination of: a driving member; a frame on which said driving member is movably mounted; a driving end of said driving member having a socket therein adapted to hold a projectile, said socket open toward the forward end of said driving member and in a direction in which said driving member is moved relative to said frame; sear means engageable with said driving member; spring means tending to force said driving member forwardly against said sear means; and trigger means disposed to release said sear means to permit said spring to project said driving member forwardly; said sear means disposed to hold said plunger against compression of said spring means and in cocked position; said trigger means operable to release said sear means disposed and projecting forwardly beyond said frame and in a direction toward which said driving member is disposed to be projected by said spring means, said trigger disposed when moved in a relatively rearward direction by contact with the work to release said sear means and said driving member.

7. The invention, as defined in claim 6, wherein: an extension handle is coupled to said frame, and adapted to reach said tag gun into overhead position and to permit swinging of said frame to impinge said trigger against the side of a cotton bale, or the like, well above a person's head.

References Cited

UNITED STATES PATENTS

| | | | |
|---|---|---|---|
| 806,229 | 12/1905 | Young | 40—305 X |
| 829,062 | 8/1906 | Dollman | 40—305 X |
| 1,940,739 | 12/1933 | Arant | 227—146 X |
| 2,910,752 | 11/1959 | Gagnier | 85—21 X |
| 3,017,636 | 1/1962 | Koennecke | 227—7 |

FOREIGN PATENTS 1,278,120 10/1961 France.

WILLIAM W. DYER, Jr., *Primary Examiner.*

F. T. YOST, *Assistant Examiner.*